(12) United States Patent
Novacek

(10) Patent No.: US 10,118,637 B2
(45) Date of Patent: Nov. 6, 2018

(54) LOAD-SENSING SYSTEM

(71) Applicant: Eaton Intelligent Power Limited, Dublin 4 (IE)

(72) Inventor: William John Novacek, Bloomington, MN (US)

(73) Assignee: Eaton Intelligent Power Limited, Dublin (IE)

( * ) Notice: Subject to any disclaimer, the term of this patent is extended or adjusted under 35 U.S.C. 154(b) by 238 days.

(21) Appl. No.: 15/205,472

(22) Filed: Jul. 8, 2016

(65) Prior Publication Data

US 2018/0009471 A1   Jan. 11, 2018

(51) Int. Cl.
| | |
|---|---|
| *B62D 5/06* | (2006.01) |
| *F15B 11/08* | (2006.01) |
| *F15B 13/04* | (2006.01) |
| *B62D 5/09* | (2006.01) |
| *B62D 5/087* | (2006.01) |
| *B62D 5/12* | (2006.01) |
| *B62D 6/10* | (2006.01) |

(52) U.S. Cl.
CPC .............. *B62D 5/061* (2013.01); *B62D 5/062* (2013.01); *B62D 5/087* (2013.01); *B62D 5/09* (2013.01); *F15B 11/08* (2013.01); *F15B 13/0401* (2013.01); *B62D 5/12* (2013.01); *B62D 6/10* (2013.01); *F15B 2211/30* (2013.01)

(58) Field of Classification Search
CPC ...... B62D 5/045; B62D 13/026; B62D 5/061; B62D 5/062; B62D 5/087; F15B 2211/50572; F15B 13/026; F15B 11/162
USPC ......................................................... 60/420
See application file for complete search history.

(56) References Cited

U.S. PATENT DOCUMENTS

| | | | |
|---|---|---|---|
| 4,620,416 A | 11/1986 | Yip et al. | |
| 2014/0366520 A1* | 12/2014 | Krahn ................. | F15B 13/0402 60/464 |

OTHER PUBLICATIONS

Flow Dividers catalog, Eaton Corporation, 20 pages (Sep. 2008).
Novacek, W., "Load-Sensing Steering—Analysis and Application," Eaton Corporation, 8 pages (Jul. 1985).

* cited by examiner

*Primary Examiner* — F. Daniel Lopez
*Assistant Examiner* — Daniel Collins
(74) *Attorney, Agent, or Firm* — Merchant & Gould P.C.

(57) ABSTRACT

The present disclosure relates to a load-sense system such as a load-sense steering system that operates in a static load-sense mode for low flows and operates in a dynamic load-sense mode for high flows.

23 Claims, 11 Drawing Sheets

LOAD-SENSING SYSTEM

TECHNICAL FIELD

The present disclosure relates generally to load-sensing systems. More particularly, the present disclosure relates to load-sensing steering systems having priority valves.

BACKGROUND

Hydraulic control systems are used to control the operation of hydraulic actuators such as steering cylinders. A typical hydraulic control system can receive a manual input from an operator, and based on the input can produce a hydraulic response that is correlated with the input. For example, in the case of a hydraulic steering system for a vehicle, the operator may turn a steering wheel which causes the hydraulic system to concurrently actuate a steering cylinder in such a way that the wheels or tracks of the vehicle turn at a rate and degree that correspond to the rate and degree in which the steering wheel is turned. Typically, the manual input provided by the operator causes the displacement (i.e., deflection, movement, etc.) of an actuator control valve which controls hydraulic fluid flow to the hydraulic actuator. In hydraulic systems, the amount of load applied to the hydraulic actuator can alter the way the hydraulic system performs. For example, for certain actuator control valves, the gain rate (e.g., the rate the hydraulic flow changes per incremental movement of the valve) varies based on load. FIG. 1 shows an example gain curve for a typical closed-center steering control unit. As depicted, the valve provides substantially lower gain rates under heavy loads as compared to under light loads.

Hydraulic systems that require human reaction to compensate for load variations can be problematic. For example, a steering system that requires human reaction to compensate for steering load variations caused by ground speed and terrain variations may result in the operator feeling less secure. This can cause a reduction in productivity. To address such a situation, load-sense systems have been developed. Load-sense systems typically control hydraulic pressure and flow so that a given hydraulic system will react the same regardless of load. FIG. 2 illustrates an example gain curve for a typical load-sense steering control unit. As shown, the gain rates are the same regardless of load.

SUMMARY

Aspects of the present disclosure relate to a load-sensing system that is operable in both a static load-sense mode and in a dynamic load-sense mode. In certain examples, the load-sensing system operates in the static load-sense mode for low-flow conditions and operates in the dynamic load-sense mode for high-flow conditions. This type of configuration allows the system to be set at a lower standby or control pressure to reduce energy losses. For low-flow conditions, a lower control pressure associated with the static load-sense mode provides acceptable system responsiveness. However, it will be appreciated that higher flow conditions may require higher control pressures to achieve acceptable levels of performance. Under high-flow conditions, the system can operate in the dynamic load-sense mode in which control pressure is increased by dynamically boosting the load sense signal to improve the responsiveness of the system Another aspect of the present disclosure relates to a load-sensing priority valve including a load-sense boost orifice that only opens as the priority valve shifts to supply relatively high flow levels. In certain examples, the load-sense boost orifice has a variable orifice area which varies depending upon a position of the priority valve. In certain examples, the load-sense boost orifice is closed for low flow conditions and opens proportionately for high-flow conditions. Thus, for high-flow conditions, the load-sense boost orifice will have an orifice area that varies directly with the position of the priority valve and the level of flow passing through the priority valve to the priority circuit.

A further aspect of the present disclosure relates to a load-sensing system having a variable orifice for providing a dynamic load-sense signal. It will be appreciated that the various aspects disclosed herein are applicable to any type of load-sense system. Example load-sense systems include load-sense steering systems and load-sense braking systems.

A variety of other aspects are set forth in the description that follows. The aspects relate to individual features as well as combinations of features. It is to be understood that both the forgoing general description and the following detailed description are exemplary and explanatory only and are not restrictive of the broad inventive aspects underlying the present disclosure.

DETAILED DESCRIPTION

Figure 1:
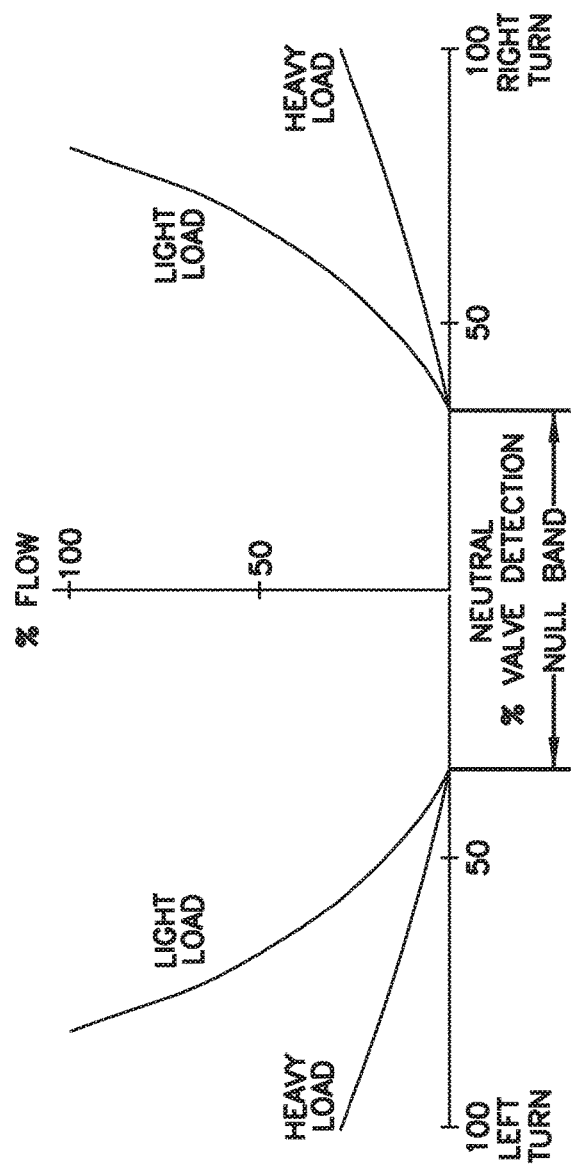
FIG. 1 is a gain curve for a prior art closed-center steering control unit.
Figure 2:
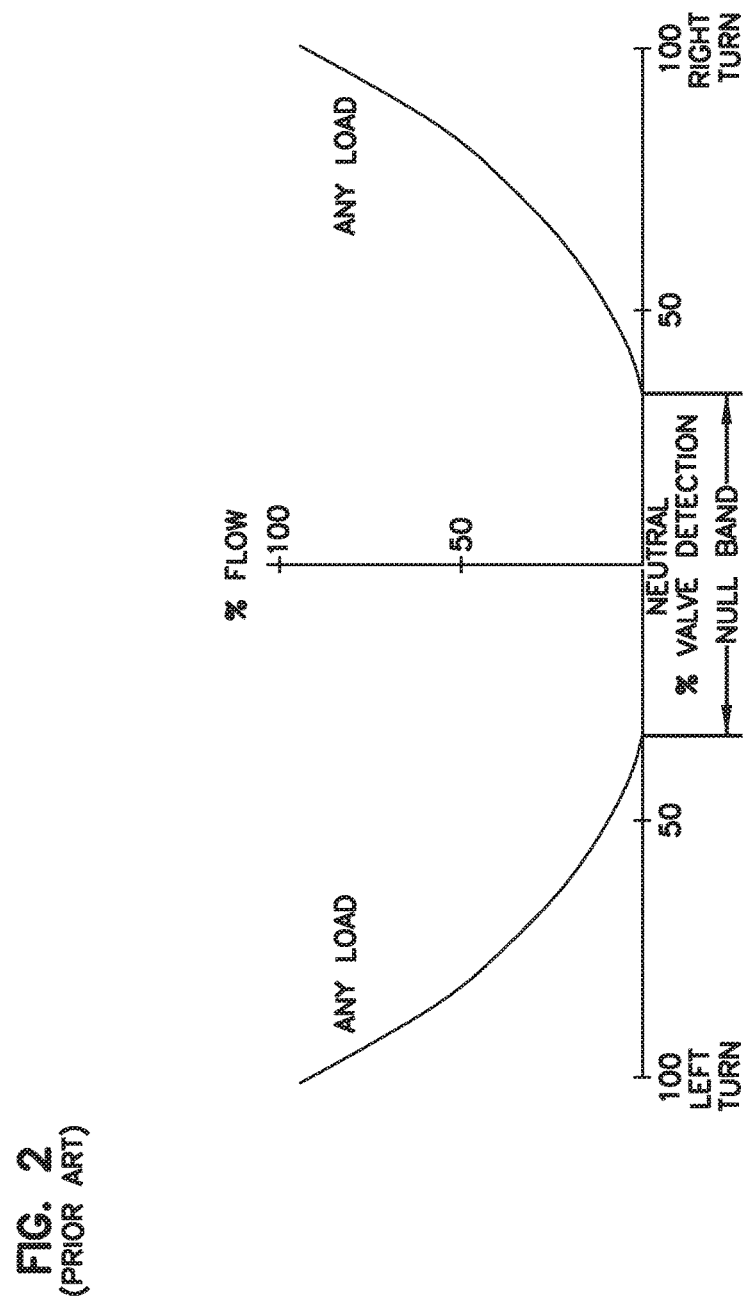
FIG. 2 is a gain curve for a prior art load-sensing steering control unit.

The goal of a typical load-sensing system is to match the flow and pressure requirements specified for a given application (e.g., steering for a vehicle). Matching the flow and pressure requirements can be achieved through the use of a pressure compensator valve member (e.g., a pressure compensator spool) in a priority valve. The primary principle that governs the operation of load-sensing systems is that a constant pressure drop across a given orifice area of an orifice will yield a constant flow through the orifice. In a typical load-sensing hydraulic system, an actuator control unit defines an actuator control orifice that provides fluid flow to an actuator. The actuator control orifice has a variable area, and it is desirable to maintain a constant pressure drop across the orifice regardless of the area of the orifice. This is achieved through the use of a load-sensing priority valve. The load-sensing priority valve defines a control flow orifice for providing hydraulic fluid to the actuator control unit. The control flow orifice has a variable size and is defined in part by a moveable priority valve member. The movable priority valve member is biased by a control spring toward a position where the control flow orifice is open. The pressure provided by the control spring can be referred to as a control pressure. A pilot signal taken from upstream of the actuator control orifice applies pilot pressure to the priority valve member in a direction that opposes the control spring. A load-sense signal taken from downstream of the actuator control orifice applies load sense pressure to the priority valve member in a direction that assists the control spring. The opposing load sense and pilot pressures cooperate to ensure that the pressure drop across the actuator control orifice equals the control pressure provided by the control spring regardless of load.

When the orifice area of the actuator control orifice enlarges (e.g., via manual input from an operator), the pressure drop across the actuator control orifice becomes lower than the control pressure. This reduction in pressure drop causes the control spring to shift the priority valve member to a position where the control flow orifice enlarges such that increased control flow is provided to the actuator control orifice. The control flow increases until the pressure drop across the actuator control orifice is equalized with the control pressure provided by the control spring. When the orifice area of the actuator control orifice reduces, the pressure drop across the actuator control orifice becomes higher than the control pressure. This increase in pressure drop causes the pilot pressure to shift the priority valve member against the resistance of the control spring to a position where the control flow orifice is reduced such that reduced flow is provided to the actuator control orifice. The control flow reduces until the pressure drop across the actuator control orifice is again equalized with the control pressure provided by the control spring.

It will be appreciated that the various aspects of the present disclosure are applicable to any type of load-sense hydraulic system (e.g., steering systems, braking systems or other types of systems). However, for the purpose of explanation, the remainder of the present disclosure will focus on load-sensing steering systems.

Figure 3:
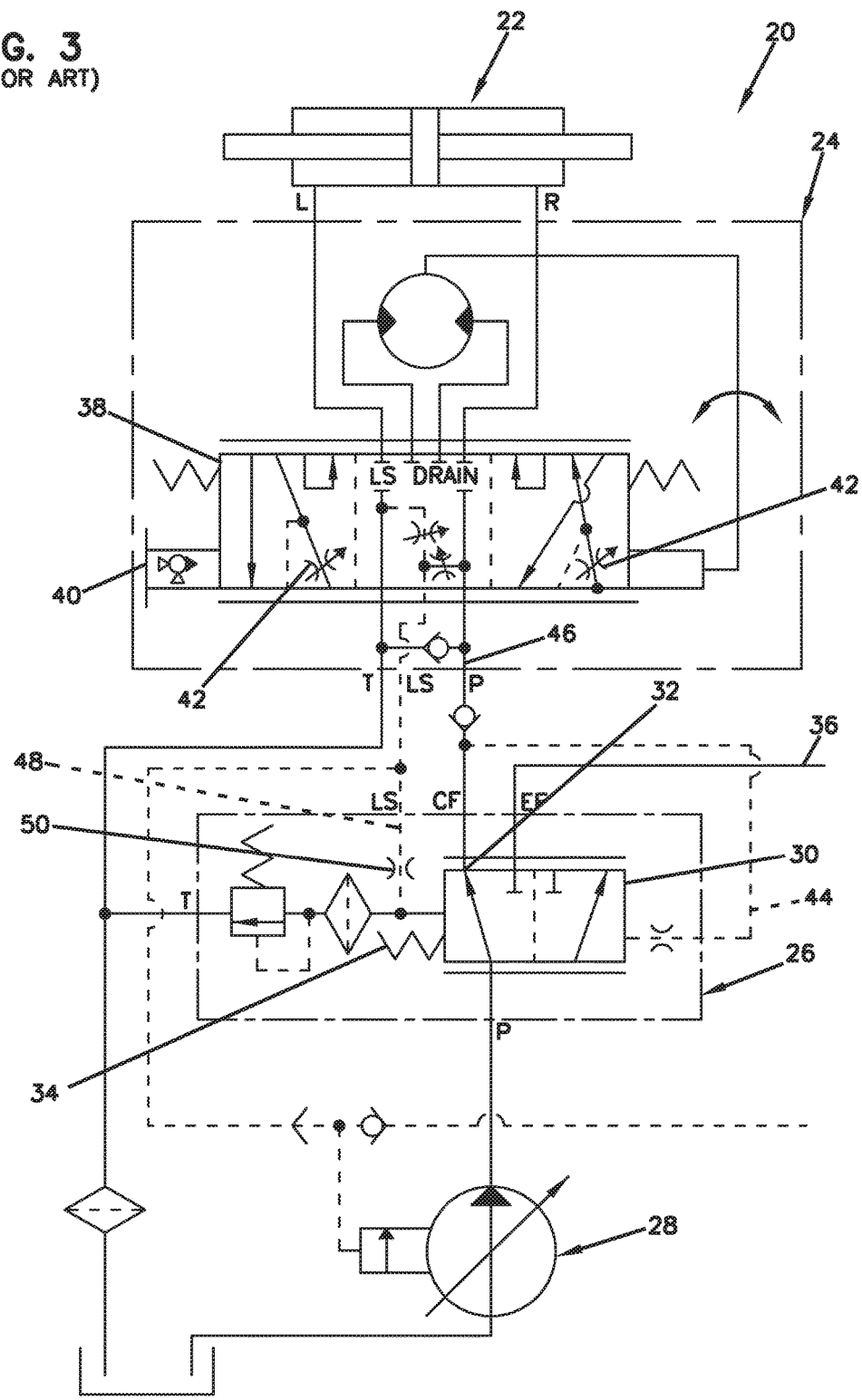
FIG. 3 illustrates a prior art load-sensing steering system that utilizes a static load-sense signal.

FIG. 3 illustrates a prior art load-sensing steering system 20 that utilizes a static load-sense signal. The load-sensing steering system 20 includes a steering cylinder 22, a steering control unit 24 for controlling hydraulic fluid flow provided to the steering cylinder 22, a load-sense priority valve unit 26 for controlling flow provided to the steering control unit 24 and a hydraulic pump 28 for providing pressurized hydraulic fluid to the load-sense priority valve unit 26. The load-sense priority valve unit 26 includes a movable priority valve member 30 that at least partially defines a control flow orifice 32 having an orifice area that varies directly with the movement of the priority valve member 30. A control pressure spring 34 biases the priority valve member 30 in a direction where the control flow orifice 32 is open. When steering is not taking place, the load-sense priority valve unit 26 can direct flow from the hydraulic pump 28 to an auxiliary circuit 36. When steering is ongoing, the load-sense priority valve unit 26 directs flow to the steering control unit 24.

The steering control unit 24 includes a three-position directional control valve 38 for controlling the hydraulic fluid flow provided to the steering cylinder 22. The directional control valve 38 can be moved between a neutral position, a first steering position, and a second steering position. In the neutral position, flow to the steering cylinder 22 is blocked. Depending upon the direction it is desired to steer, a manual steering component 40 can move the directional control valve 38 from the neutral position to either the first steering position or the second steering position. In the first steering position, the steering cylinder 22 is driven from left to right. In the second steering position, the steering cylinder 22 is driven from right to left. Steering control orifices 42 defined by the directional control valve 38 control a rate that the hydraulic fluid is delivered to the steering cylinder 22.

The priority valve member 30 of the load-sense priority valve unit 26 is also subject to pilot pressure that opposes the control pressure spring 34. The pilot pressure can be delivered by a pilot line 44 that is in fluid communication with a control flow line 46 that extends between the control flow orifice 32 and the steering control orifices 42. The load-sense steering system 20 further includes a load-sense line 48 that is connected to tank when the directional control valve 38 is in the neutral position and is connected immediately downstream of the active steering control orifice 42 when the directional control valve 38 is in either the first or second steering position. The load-sense line 48 includes a fixed load-sense orifice 50. The load-sense pressure that is taken immediately downstream from the steering control orifice 42 is applied statically through the load-sense line 48 to the priority valve member 38 in a direction that assists the control pressure spring 34. The load-sense signal applied by the load-sense line 48 can be referred to as "static" because there is no hydraulic fluid flow through the line except during transient conditions. In contrast, in a "dynamic" load-sense line, hydraulic fluid flows through the dynamic load-sense line during the time the dynamic load-sense signal is being applied.

Figure 4:
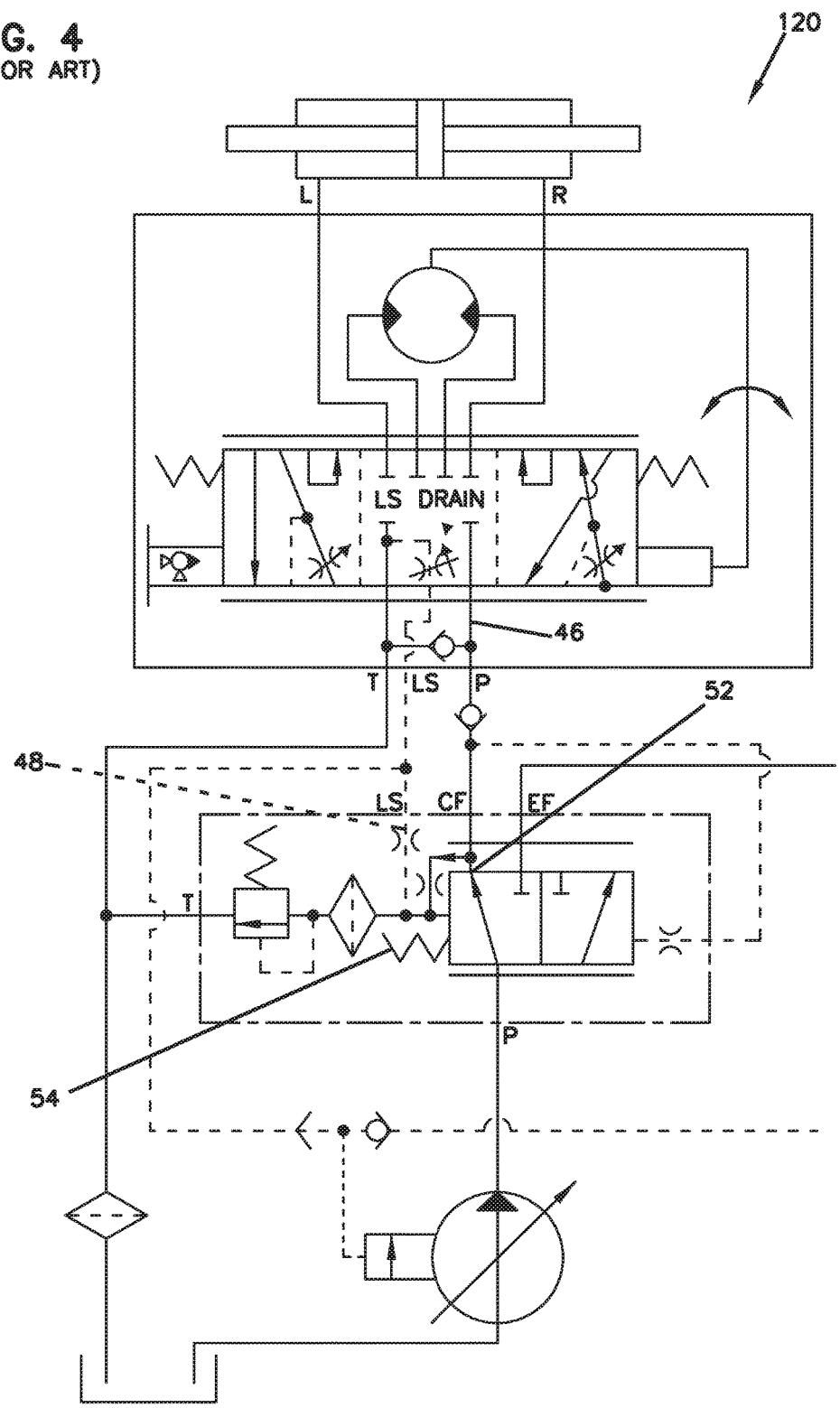
FIG. 4 illustrates a prior art load-sensing steering system that utilizes a dynamic load-sense signal.

FIG. 4 shows another prior art load-sensing steering system 120. The load-sensing steering system 120 has the same components as the load-sensing steering system 20 except a dynamic load-sense line 52 has been added that provides fluid communication between the control flow line 46 and the load-sense line 48. A dynamic load-sense orifice 54 is provided along the dynamic load-sense line 52. The dynamic load-sense orifice 54 has a fixed orifice area. During steering, flow passes from the control flow line 46 through the dynamic load-sense line 52 and the dynamic load-sense orifice 54 to the load-sense line 48. In this way, the dynamic load-sense line 52 assists in pressurizing the load-sense line 48 such that the load-sense pressure applied to the priority valve member 30 is boosted. The fluid connection provided by the dynamic load-sense line 52 causes hydraulic fluid to continuously flow through the load-sense line 48 back to the position immediately downstream from the steering control orifice 42. At this downstream location, the flow from the load-sense line 48 combines with the flow passing through the steering control orifice 42 and the combined flow is directed toward the steering cylinder 22.

As compared to static load-sensing steering systems, dynamic load-sensing steering systems can provide faster steering response and more freedom in designing the load-sensing steering system. However, a disadvantage of dynamic load-sense steering systems is that such systems typically utilize relatively high standby\control pressure which can lead to energy losses.

Aspects of the present disclosure relate to load-sense steering systems and other load-sense systems that can operate at relatively low control pressures for standby and low-flow conditions, and that can also operate at higher control pressures to improve performance and responsiveness at high flow conditions. In one example, a load-sense system in accordance with the principles of the present disclosure is operable in a static load-sense mode for low-flow conditions, and transitions to a dynamic load-sense mode for high-flow conditions. With this type of design, energy losses are reduced because the control pressure used for standby and low-flow conditions is relatively low. At the same time, systems in accordance with the principles of the present disclosure can provide the higher control pressures needed to provide enhanced steering responsiveness at high flow conditions. In certain examples, a variable dynamic load-sense orifice can be incorporated or integrated into a load-sense priority valve. In certain examples, a dynamic load-sense orifice can be configured to only dynamically boost the load-sense signal when higher flow is needed for maximum flow conditions. It will be appreciated that for certain applications, the lower control pressure can be provided by using a smaller control spring (i.e., a control spring that exerts a lower spring load) than would typically be used in a prior art load sense system for a comparable application.

Figure 5:
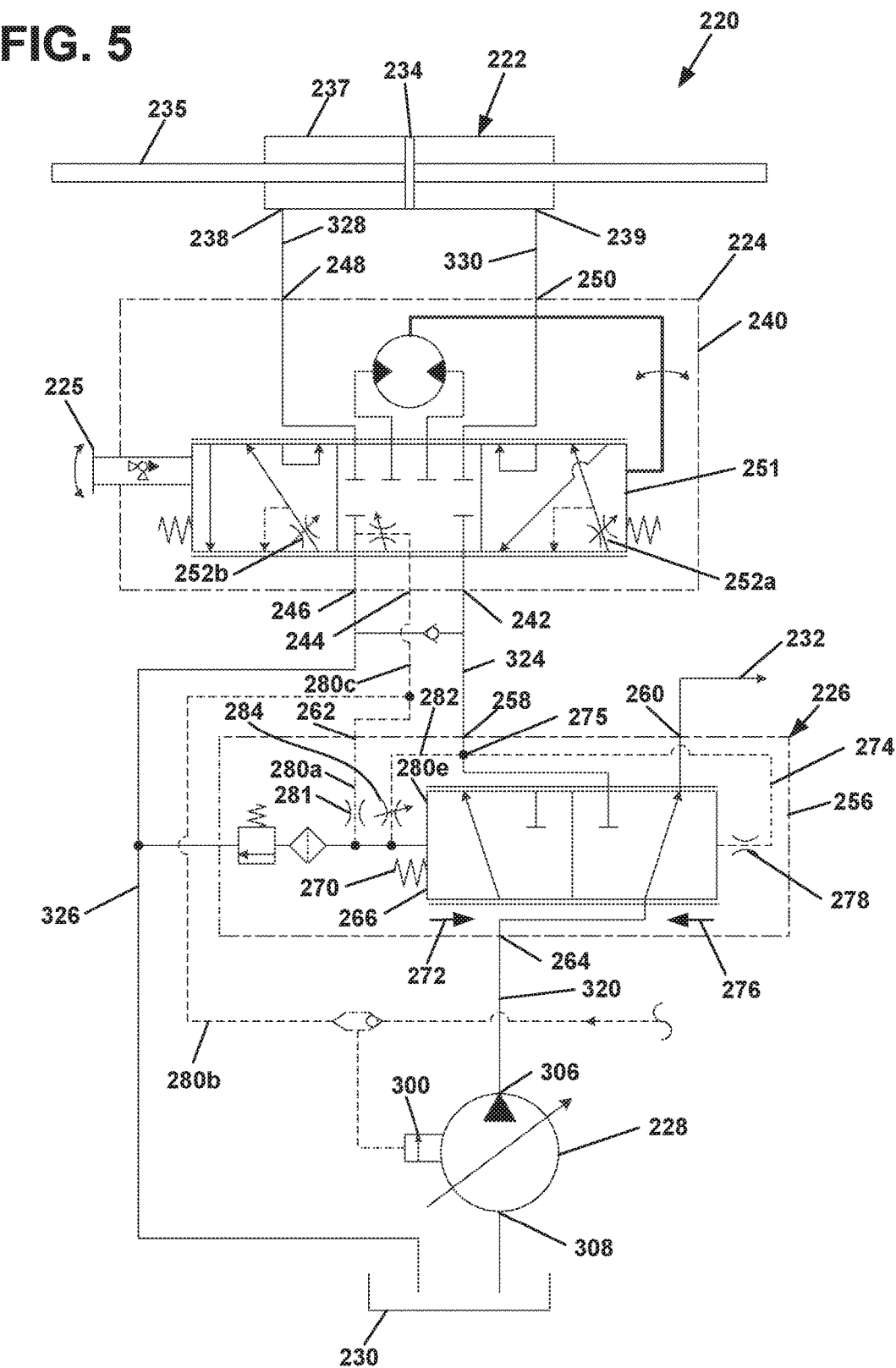
FIG. 5 illustrates a load-sensing steering system in accordance with the principles of the present disclosure, the load-sensing steering system includes a load-sensing priority valve that provides priority flow to a steering control unit, the steering control unit is shown in a neutral position.

FIG. 5 illustrates a load-sensing steering system 220 in accordance with the principles of the present disclosure. The load-sensing steering system 220 includes a steering cylinder 222 (i.e., an actuator) and a steering control unit 224 for controlling hydraulic fluid flow to and from the steering cylinder 222. The steering control unit 224 receives steering input from a manual steering component 225 (e.g., a steering wheel, joy stick, steering levers, other steering controllers) that can be manually manipulated by an operator to steer a vehicle. The load-sensing steering system 220 further includes a load-sense priority valve unit 226 that directs fluid flow from a hydraulic pump 228 to the steering control unit 224. The hydraulic pump 228 draws hydraulic fluid from a tank 230. The load-sense priority valve unit 226 can be configured to modulate flow from the hydraulic pump 228 between the steering control unit 224 (i.e., the steering circuit) and an auxiliary circuit 232. The load-sense priority valve unit 226 is preferably configured so that flow priority is given to the steering circuit rather than the auxiliary circuit 232. In this way, when steering is not taking place (i.e., the steering control unit 224 is in neutral as shown at FIG. 5), the load-sense priority valve unit 226 will direct flow from the hydraulic pump 228 to the auxiliary circuit 232. However, as soon as the manual steering component 225 is manipulated to initiate steering, the load-sense priority valve unit 226 immediately shifts flow from the auxiliary circuit 232 to the steering control unit 224 to provide a steering response.

Referring to FIG. 5, the steering cylinder 222 is depicted as a linear actuator including a piston 234 carrying a piston rod 235 (e.g., a double ended or single ended piston rod). The piston rod 235 can be used to turn or pivot wheels, tracks or other structures used to propel and turn a vehicle. Pressurized hydraulic fluid from the steering control unit 224 causes the piston 234 and the rod 235 carried therewith to reciprocate back and forth along a piston sleeve 237. The piston sleeve 237 can include a first port 238 and a second port 239. The first and second ports 238, 239 are located on opposite sides of the piston 234. When pressurized hydraulic fluid is directed into the first port 238, the piston 234 is driven to the right and hydraulic fluid is expelled from the second port 239. When pressurized hydraulic fluid is directed into the second port 239, the piston 234 is driven to the left and hydraulic fluid is expelled from the first port 238.

The steering control unit 224 includes a control unit housing 240 defining a pressure port 242, a load sense port 244, a tank port 246, a first steering port 248 and a second steering port 250. The steering control unit 224 is depicted including a 3-position directional valve 251 having a neutral position (see FIG. 5), a first steering position (see FIG. 6) and a second steering position (see FIG. 7). The directional valve 251 defines steering control orifices 252a, 252b. The directional valve 250 also includes a load-sense drain orifice 254. The steering control orifices 252a, 252b and the load-sense drain orifice 254 are variable orifices in which the orifice areas for allowing the passage of hydraulic fluid flow vary depending upon the position of the directional valve 251.

The load-sense priority valve unit 226 includes a priority valve housing 256 defining a control flow port 258 (i.e., a priority flow port), an auxiliary port 260, a load sense port 262, and a pump port 264. The load-sense priority valve unit 226 includes a priority valve 266 defining a control flow orifice 268 (see FIGS. 6 and 7). The priority valve 266 is modulated to control the orifice area of the control flow orifice 268. The control flow orifice 268 is in fluid communication with the control flow port 258. The load-sense priority valve unit 226 further includes a control pressure spring 270 that biases the priority valve 266 in a first direction 272 in which the control flow orifice 268 is fully open. The load-sense priority valve unit 226 further includes a pilot pressure line 274 that applies pilot pressure to the priority valve 266 in a second direction 276 opposite from the first direction 272. Thus, the pilot pressure opposes the control pressure spring 270. The pilot pressure line 274 is in fluid communication with a location 275 downstream from the control flow orifice 268 such that control flow pressure can be applied to the pilot pressure line 274. A pilot pressure line orifice 278 can be provided along the pilot pressure line 274.

The load-sense priority valve unit 226 also includes a load-sense line segment 280a for applying load-sense signal pressure to the priority valve 266 in a direction that assists the control pressure spring 270. The load-sense pressure can be communicated to a load-sense pressure chamber 280e. The load-sense signal segment 280a is fluidly connected to the load sense port 262. A load-sense orifice 281 is positioned along the load-sense line segment 280a. The load-sense priority valve unit 226 further includes a dynamic load-sense line 282 that provides fluid communication between the load-sense line segment 280a or the load-sense pressure chamber 280e and a location 275 downstream from the control flow orifice 268. A variable dynamic load-sense orifice 284 is provided along the dynamic load-sense line 282. The dynamic load-sense orifice 284 has a variable orifice area which can vary in size directly with the size of the control flow orifice 268. The dynamic load-sense orifice 284 is closed during low flow conditions such that the load-sense pressure provided to the priority valve 266 is based on a static load-sense signal. In contrast, for high-flow conditions in which the control flow orifice 268 has a relatively large orifice size, the dynamic load-sense orifice 284 opens to boost the load-sense pressure used to assist the control pressure spring 270. In this way, control pressure of the load-sense priority valve unit 226 is boosted by the dynamic load-sense signal to enhance responsiveness during high flow conditions.

Figure 8:
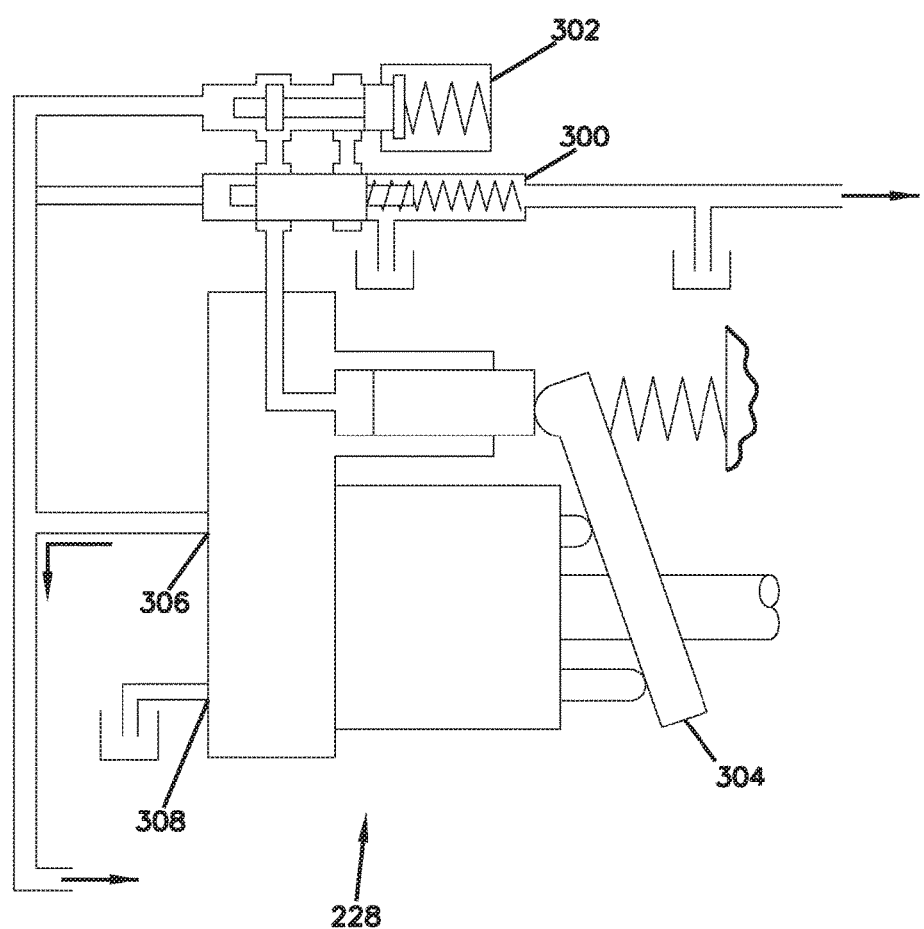
FIG. 8 illustrates an example load-sensing pump that can be used in combination with the load-sensing steering system of FIGS. 5-7.

The hydraulic pump 228 is depicted as a variable displacement hydraulic pump. In other examples, a fixed displacement hydraulic pump can be used. In certain examples where a variable displacement pump is used, the hydraulic pump 228 can include a flow compensation valve 300 (see FIG. 8) that receives a load-sense signal and increases or decreases the stroke length of the pump in direct proportion to the magnitude of the load-sense signal. The hydraulic pump 228 can also be controlled by a pressure compensation valve 302 (e.g., a pressure relief as shown at FIG. 8) that limits the maximum pressure that can be output by the hydraulic pump 228. As depicted at FIG. 8, the hydraulic pump 228 includes a swash plate 304 that is pivoted to adjust the stroke length of the hydraulic pump 228. As the stroke length increases, the volume of hydraulic fluid discharged by the pump for each rotation of the hydraulic pump increases. As the stroke length decreases, the volume of hydraulic fluid discharged by the hydraulic pump 228 for each rotation of the hydraulic pump decreases. As shown at FIG. 8, the hydraulic pump 228 includes an outlet 306 and an inlet 308. While an axial piston pump is shown, any type of hydraulic pump (e.g., radial pump, gear pump, vane pump, etc.) can be used.

Referring back to FIG. 5, the inlet 308 of the hydraulic pump 228 is connected to tank 230 and the outlet 306 of the hydraulic pump 228 is connected to the pump load-sense priority valve unit 226 by pump line 320. The flow compensation valve 300 is coupled to the load-sense port 244 by load-sense line segment 280b. Control flow port 258 of the load-sense priority valve unit 226 is fluidly connected to the pressure port 242 of the steering control unit 224 by a control flow line 324. The load-sense port 262 of the load-sense priority valve unit 226 is fluidly connected to the load sense port 244 of the steering control unit 224 by load-sense line segment 280c. The tank port 246 of the steering control unit 224 is fluidly connected to tank 230 by tank line 326. The first port 238 of the steering cylinder 222 is fluidly connected to the first steering port 248 of the steering control unit 224 by steering control line 328. The second port 239 of the steering cylinder 222 is fluidly connected to the second steering port 350 of the steering control unit 324 by steering control line 330.

Referring to FIG. 5, the steering control unit 224 is shown with the directional valve 251 in a neutral position. In the neutral position, the pressure port 242 is blocked and no flow is provided to the first and second steering ports 248, 250. Also, the load-sense port 244 is fluidly connected to the tank port 246 while the load sense drain orifice 254 is open such that the load-sense line 322 can drain to tank 230. Also, the load-sense priority valve unit directs pump flow to the auxiliary circuit 232 through the auxiliary port 260.

Figure 6:
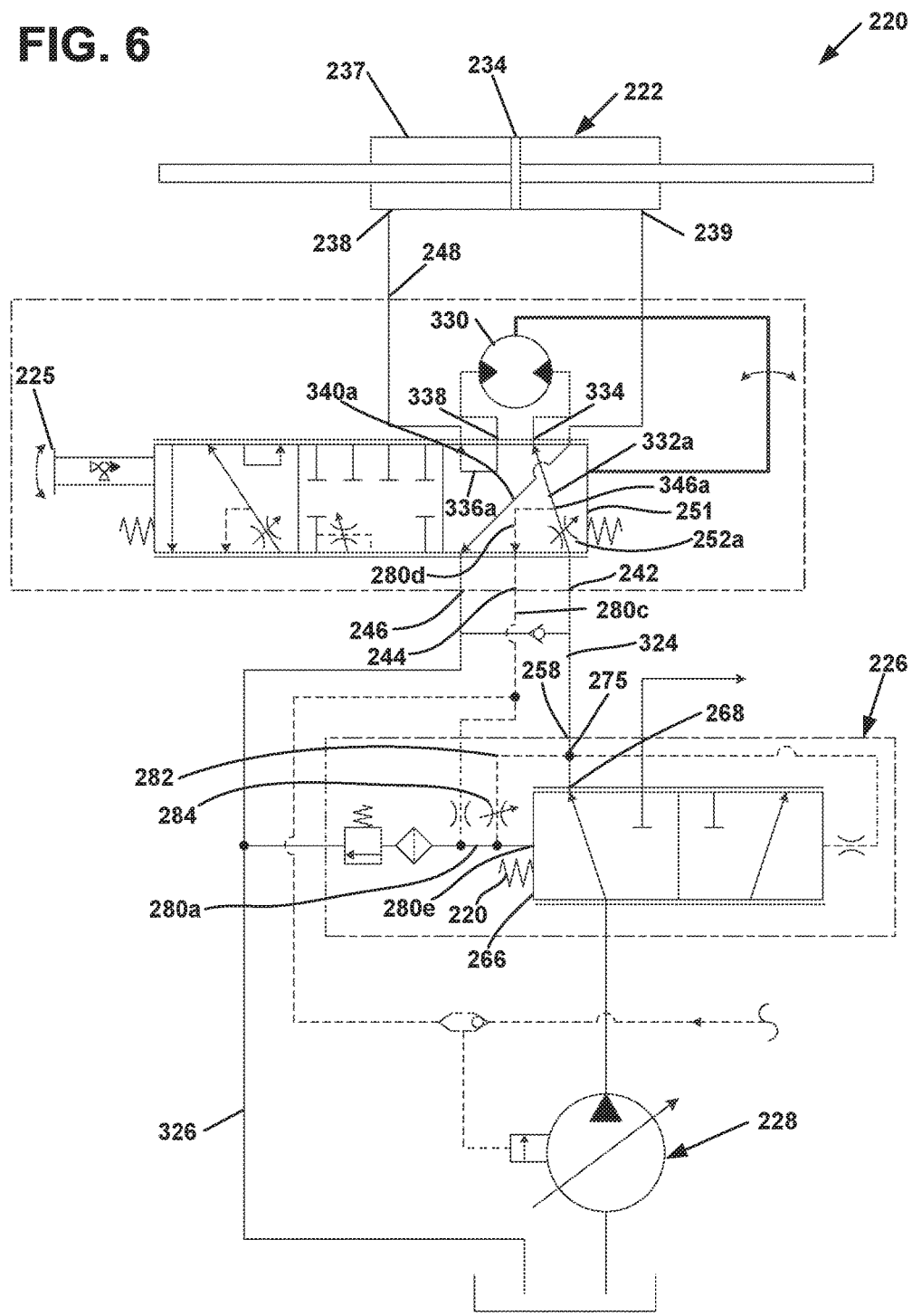
FIG. 6 shows the load-sensing steering system of FIG. 5 with the steering control unit in a first steering position (i.e., a first activated position)

FIG. 6 shows the directional valve 251 of the steering control unit 224 in the first steering position. In the first steering position, the pressure port 242 is placed in fluid communication with the first steering port 248 such that hydraulic flow is provided to the steering cylinder 222 through the first port 238. It will be appreciated that the directional valve 251 is moved to the first position by an operator through the manual steering component 225. Hydraulic fluid flow through the steering control unit 224 passes through a flow meter 330. A flow path 332a couples the pressure port 242 to a flow meter port 334. Flow path 336a couples flow meter port 338 to the first steering port 248. Flow path 340a fluidly couples the second steering port 250 to the tank port 246. A load-sense line segment 280d connects to the flow path 332a at a location 346a downstream from the first steering control orifice 252a. Load-sense line segment 280d is fluidly coupled to the load-sense line segment 280c through the load-sense port 244. The steering control orifice 252a is positon along the flow path 332a and controls flow to the first port 238 of the steering cylinder 222. Manipulation of the manual steering component 225 can manipulate the directional valve 251 to enlarge or reduce the orifice area of the steering control orifice 252a to increase or decrease the speed of the steering cylinder 222.

In operation of the load-sense steering system 220 in the first steering position of FIG. 6, pressurized fluid from the pump passes through the load-sense priority valve unit 226 and is directed to the pressure port 242 of the steering control unit 224 by the control flow line 324. From the pressure port 242, flow proceeds through the steering control orifice 252a along flow path 332a to the flow meter port 334. Flow then passes through the flow meter 330 and returns to the directional valve 251 through flow meter port 338. Flow path 336a then directs flow to the first steering port 248. Flow then proceeds into the piston sleeve 237 through the first port 238. As flow enters the first port 238, the piston 234 is driven to the right causing fluid to exit the piston sleeve 237 through the second port 239. The hydraulic fluid that exits the second fluid port 239 enters the steering control unit 224 through the second steering port 250 and passes through the directional valve 251 through flow path 340a. Flow path 340a directs flow to tank port 246. From tank port 246, flow proceeds along tank line 326 to tank 230.

While the steering control unit 224 is in the first steering position, the load-sense priority valve unit 226 operates to modulate flow through the control flow orifice 268 such that a constant pressure drop is maintained across the steering control orifice 252a. When the steering control orifice 252a enlarges, the pressure drop across the steering control orifice 252a lowers thereby causing the load-sense priority control valve 226 to further open the control flow orifice 268 to increase the flow provided to the steering control orifice 252a to a level where the constant pressure drop across the steering control orifice 252a is maintained. Similarly, when the area of the steering control orifice 252a is reduced, the pressure drop across the steering control orifice 252a increases thereby causing the load-sense priority valve unit 226 to reduce the area of the control flow orifice 268 so reduced flow is provided to the steering control orifice 252a. It will be appreciated that the area of the flow control orifice 268 is reduced to a level where the pressure drop across the steering control orifice 252a is reduced back to the constant pressure drop. When the load-sense priority valve unit 226 provides relatively low flow to the steering control unit 224 through the control flow orifice 268, the dynamic load-source orifice 284 is closed (i.e., the flow area equals zero) such that fluid communication between the load-sense line segment 280a and the control flow line 324 is blocked. Under such low flow conditions, the load-sense steering system 220 operates in a static mode. In the static mode, the load-sense line segment 280d is in fluid communication with the flow path 332a at the location 346a downstream from the steering control orifice 252a. Pressure from the location 346a is communicated through the load-sense line segments 280d, 280c, 280a to the load-sense pressure chamber 280e at one end of the priority valve 266 such that the priority valve is urged by the load-sense pressure in the same direction as the control pressure spring 220. It will be appreciated that the load-sense pressure is static since there is no flow in the load-sense line 280 (i.e., the line defined by load-sense line segments 280d, 280c, 280a and the load-sense pressure chamber 280e) except during transient conditions.

When the steering control orifice 252a is opened further to increase flow to the steering cylinder 222, the priority valve 266 may respond by opening the control flow orifice 268 to a position where a relatively high flow is output through the control flow port 258. In this condition, the dynamic load-sense orifice 284 is opened causing fluid to flow from the control flow line 324 through the dynamic load-sense line 282 to the load-sense line 280. In certain examples, the dynamic load-sense line 282 may couple to the load sense line segment 280a, the load sense chamber 280e, or another part of the load-sense line 280. Flow then proceeds through load-sense line 280 back to the location 346a downstream from the steering control orifice 252a. With the dynamic load-sense orifice 284 open, the load-sense steering system 220 operates in a dynamic load-sense mode in which flow proceeds through the load-sense line segments 280a, 280c and 280d back to the location 346a downstream from the steering orifice 252a.

Figure 7:
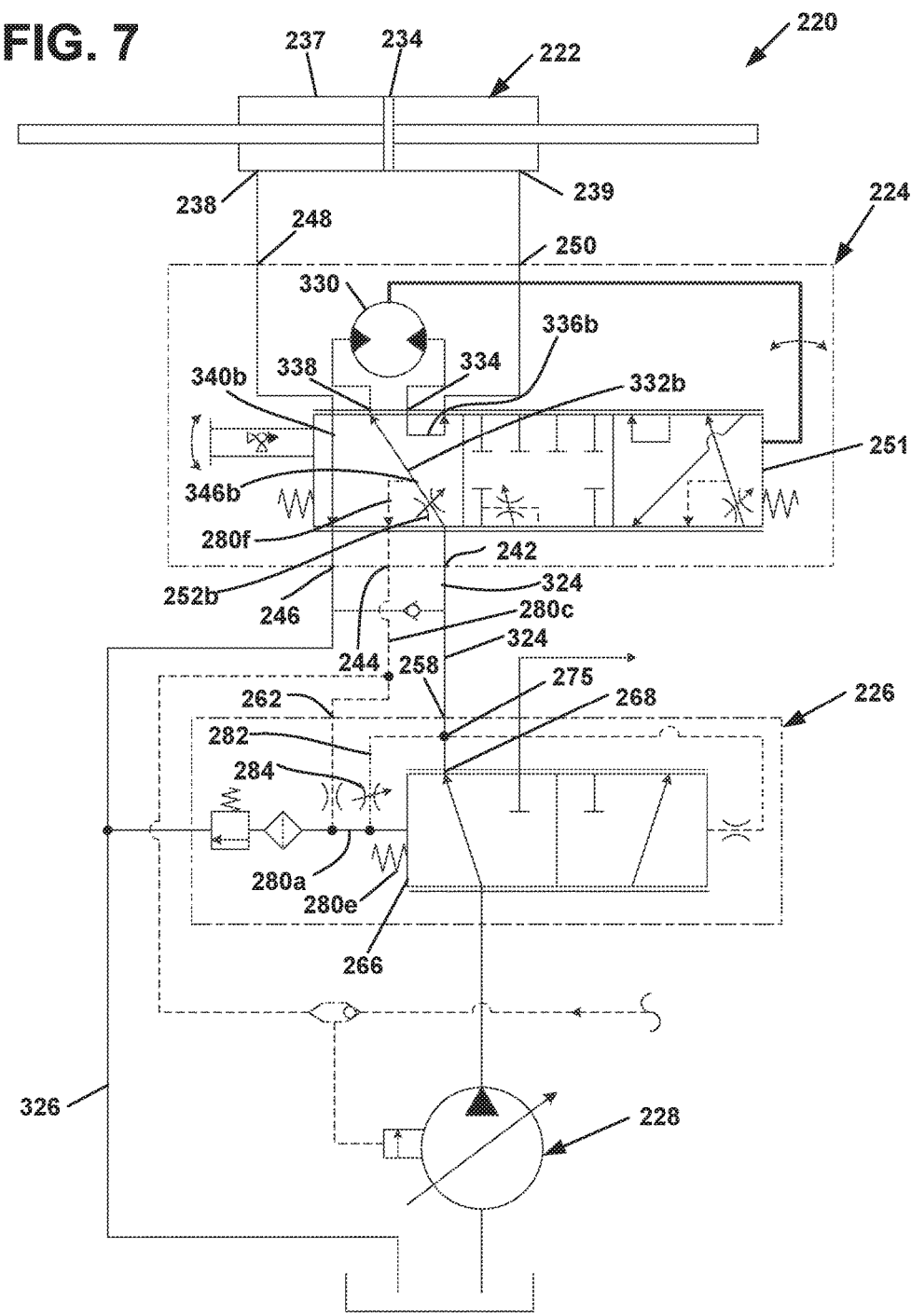
FIG. 7 shows the load-sensing steering system of FIG. 5 in a second steering position (i.e., a second activated position)

FIG. 7 shows the directional valve 251 of the steering control unit 224 in the second steering position. In the second steering position, the pressure port 242 is placed in fluid communication with the second steering port 250 such that hydraulic flow is provided to the steering cylinder 222 through the second port 239. It will be appreciated that the directional valve 251 is moved to the second position by an operator through the manual steering component 225. A flow path 332b couples the pressure port 242 to the flow meter port 338. Flow path 336b couples flow meter port 334 to the second steering port 250. Flow path 340b fluidly couples the first steering port 248 to the tank port 246. A load-sense line segment 280f connects to the flow path 332b at a location 346b downstream from the first steering control orifice 252b. Load-sense line segment 280f is fluidly coupled to the load-sense line segment 280c through the load-sense port 244. The steering control orifice 252b is positioned along the flow path 332b and controls flow to the second port 239 of the steering cylinder 222. Manipulation of the manual steering component 225 can manipulate the directional valve 251 to enlarge or reduce the orifice area of the steering control orifice 252b to increase or decrease the speed of the steering cylinder 222.

In operation of the load-sense steering system 220 in the second steering position of FIG. 7, pressurized fluid from the pump passes through the load-sense priority valve unit 226 and is directed to the pressure port 242 of the steering control unit 224 by the control flow line 324. From the pressure port 242, flow proceeds through the steering control orifice 252b along flow path 332b to the flow meter port 338. Flow then passes through the flow meter 330 and returns to the directional valve 251 through flow meter port 334. Flow path 336b then directs flow to the second steering port 250. Flow then proceeds into the piston sleeve 237 through the second port 239. As flow enters the second port 239, the piston 234 is driven to the left causing fluid to exit the piston sleeve 237 through the first port 238. The hydraulic fluid that exits the first fluid port 238 enters the steering control unit 224 through the first steering port 248 and passes through the directional valve 251 through flow path 340a. Flow path 340a directs flow to tank port 246. From tank port 246, flow proceeds along tank line 326 to tank 230.

While the steering control unit 224 is in the second steering position, the load-sense priority valve unit 226 operates to modulate flow through the control flow orifice 268 such that a constant pressure drop is maintained across the steering control orifice 252b. When the steering control orifice 252b enlarges, the pressure drop across the steering control orifice 252b lowers thereby causing the load-sense priority control valve 226 to further open the control flow orifice 268 to increase the flow provided to the steering control orifice 252b to a level where the constant pressure drop across the steering control orifice 252b is maintained. Similarly, when the area of the steering control orifice 252b is reduced, the pressure drop across the steering control orifice 252b increases thereby causing the load-sense priority valve unit 226 to reduce the area of the control flow orifice 268 so reduced flow is provided to the steering control orifice 252b. It will be appreciated that the area of the flow control orifice 268 is reduced to a level where the pressure drop across the steering control orifice 252b is reduced back to the constant pressure drop. When the load-sense priority valve unit 226 provides relatively low flow to the steering control unit 224 through the control flow orifice 268, the dynamic load-source orifice 284 is closed (i.e., the flow area equals zero) such that fluid communication between the load-sense line segment 280a and the control flow line 324 is blocked. Under such low flow conditions, the load-sense steering system 220 operates in a static mode. In the static mode, the load-sense line segment 280f is in fluid communication with the flow path 332b at a location 346b downstream from the steering control orifice 252b. Pressure from the location 346b is communicated through the load-sense line segments 280f, 280c, 280a to the load-sense pressure chamber 280e at one end of the priority valve 266 such that the priority valve is urged by the load-sense pressure in the same direction as the control pressure spring 220. It will be appreciated that the load-sense pressure is static since there is no flow in the load-sense line 280 (i.e., the line defined by load-sense line segments 280f, 280c, 280a and the load-sense pressure chamber 280e) except during transient conditions.

When the steering control orifice 252b is opened further to increase flow to the steering cylinder 222, the priority valve 266 may respond by opening the control flow orifice 268 to a position where a relatively high flow is output through the control flow port 258. In this condition, the dynamic load-sense orifice 284 is opened causing fluid to flow from the control flow line 324 through the dynamic load-sense line 282 to the load-sense line 280. In certain examples, the dynamic load-sense line 282 may couple to the load sense line segment 280a, the load sense chamber 280e, or another part of the load-sense line 280. Flow then proceeds through load-sense line 280 back to the location 346b downstream from the steering control orifice 252b. With the dynamic load-sense orifice 284 open, the load-sense steering system 220 operates in a dynamic load-sense mode in which flow proceeds through the load-sense line segments 280a, 280c and 280f back to the location 346b downstream from the steering orifice 252a.

As indicated above, for relatively low flows to the steering control unit 224 the load-sense system operates in static load-sense mode and for relatively high flows to the steering control unit the load-sense system operates in the dynamic load-sense mode. The dynamic load-sense orifice 284 is closed in the static load-sense mode and is open in the dynamic load-sense mode. The load-sensing system operates in the static load-sense mode for a first range of flow rates through the control flow orifice 268 (i.e., through the load-sense priority valve unit 226 to the steering circuit) and the load-sensing system operates in the dynamic mode for a second range of flow rates through the control flow orifice 268 (i.e., through the load-sense priority valve unit 226 to the steering circuit). The second range of flow rates is higher than the first range of flow rates, and the first and second ranges of flow rates do not overlap.

Whether the dynamic load-sense orifice 284 is open or closed is dependent upon the position of the priority valve 266 and the corresponding size of the control flow orifice 268 (which directly corresponds to the flow rate metered out by the priority valve 266). The load-sensing system transitions between a static load-sense mode and a dynamic load-sense mode at a mode transition position of the priority valve 266. The control flow orifice 268 defines a mode transition area when the priority valve 266 is in the mode transition position. If the priority valve is in a positon where the control flow orifice 268 is smaller in area than the mode transition area, the load-sensing system operates in the static load-sense mode. If the priority valve is in a position where the control flow orifice 268 is larger in area than the mode transition area, the load-sensing system operates in the dynamic load-sense mode. In one example, the mode transition position of the priority valve 266 corresponds to the control flow orifice 268 being opened to a mode transition area having a value that is the range of 10-80 percent of a maximum orifice area of the control flow orifice 268. In another example, the mode transition position of the priority valve 266 corresponds to the control flow orifice 268 being opened to a mode transition area having a value that is the range of 15-75 percent of a maximum orifice area of the control flow orifice 268. In still another example, the mode transition position of the priority valve 266 corresponds to the control flow orifice 268 being opened to a mode transition area having a value that is the range of 20-70 percent of a maximum orifice area of the control flow orifice 268.

Additionally, it will be appreciated that the load-sense orifice 284 varies in orifice area when in the dynamic load-sense mode in direct proportion with the size of the control flow orifice 268 and thus the flow rate being metered out by the priority valve 266. Hence, in the dynamic load-sense mode, the load-sense orifice 284 varies in size based on the position of the priority valve 266 (i.e., a distance the priority valve 266 is displaced from the mode transition position). When in the dynamic load-sense mode, the size of the dynamic load-sense orifice 284 will vary anywhere from slightly above zero percent-open to 100 percent-open depending upon the position of the priority valve 266 and the size of the control flow orifice 268.

To describe the above ranges in another way, the load-sense system is designed so that the dynamic load-sense orifice 284 initially opens when the control flow orifice 268 opens to a certain sized area (i.e., the mode transition area) which is dependent upon the position of priority valve 266. The exact size of the mode transition area (i.e., the exact size of the orifice area of the control flow orifice 268 when the dynamic load-sense orifice initially transitions from closed to open) will be determined by the designer at the time the valve system is designed based on the application for the valve system and based on desired performance characteristics. In certain examples, the exact size of the mode transition area could be selected from anywhere in the range of 10-80 percent, or 15-75 percent, or 20-70 percent, or 10-50 percent, or 20-40 percent of a maximum orifice area of the control flow orifice 268 depending upon desired performance characteristics. Similarly, the load-sense system is designed so that the dynamic load-sense orifice 284 fully opens when the control flow orifice 268 opens to a certain sized area which is dependent upon the position of priority valve 266. The exact size of the orifice area of the control flow orifice 268 when the dynamic load-sense orifice fully opens will be determined by the designer at the time the valve system is designed based on the application for the valve system and based on desired performance characteristics. In certain examples, the valve system is designed such that the dynamic load-sense orifice 284 reaches a full open position when the control flow orifice 268 is opened to an amount in the range of 70-100 percent open, or 80-100 percent open, or 70-95 percent open. Thus, in certain examples, the dynamic load-sense orifice 284 is fully open before the control flow orifice 268 is fully open.

Figure 9:
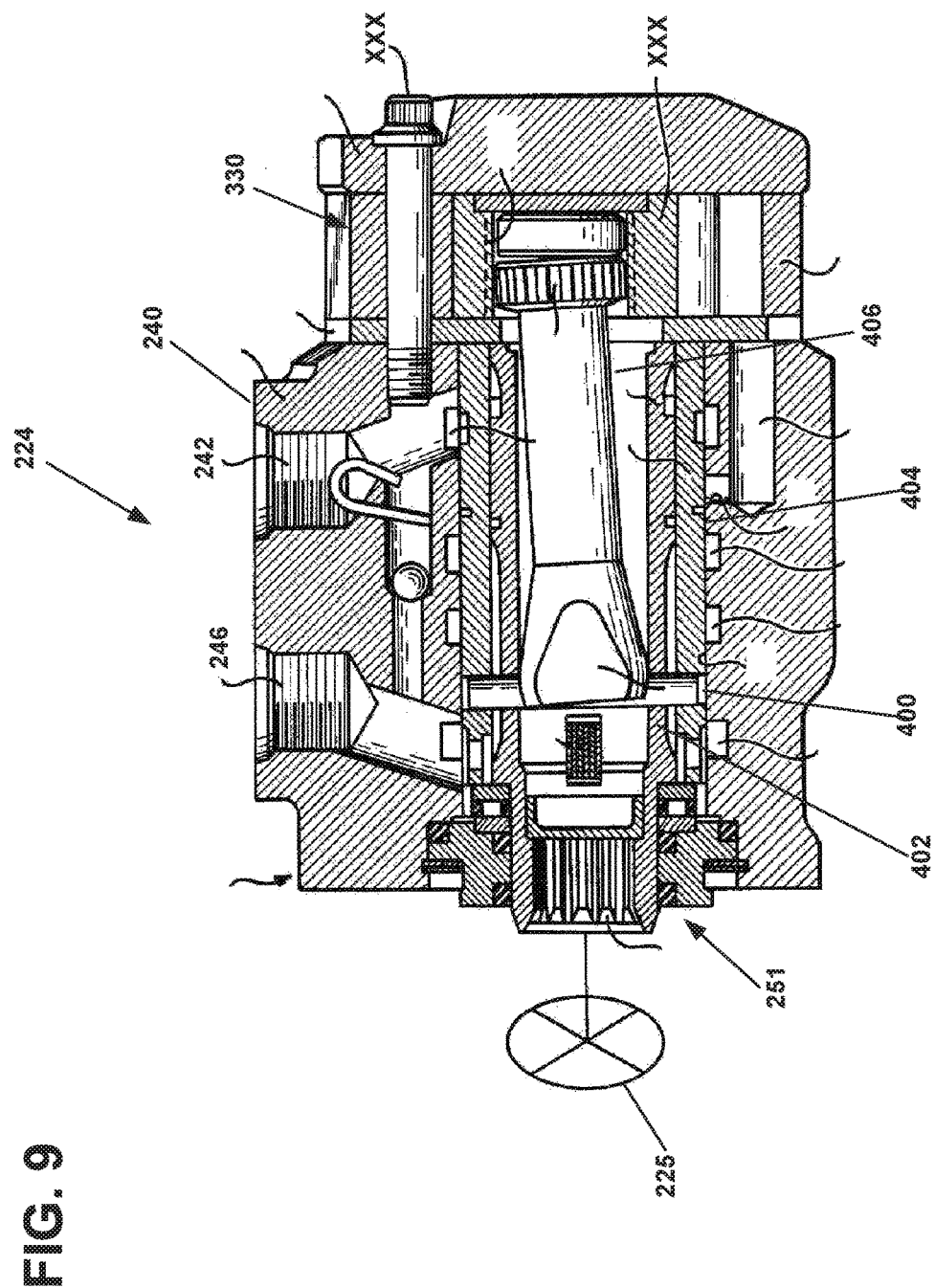
FIG. 9 illustrates an example steering control unit suitable for use with the load-sensing steering system of FIGS. 5-7.

FIG. 9 shows an example configuration for the steering control unit 224. As depicted at FIG. 9, the steering control unit 224 includes the control unit housing 240. The control unit housing 240 is cut in cross-section such that the pressure port 242 and the tank port 246 are shown. The control housing 240 defines a valve bore 400 in which a valve spool 402 and a follow-up sleeve 404 are mounted. The control housing 240, the valve spool 402 and the follow-up sleeve 404 cooperate to define the directional valve 251. The valve spool 402 can be rotated about its longitudinal axis by the manual steering component 225 to generate a steering response. A limited range of rotational movement is permitted between the valve spool 402 and the follow-up sleeve 404. The flow meter 330 is depicted as hydraulic motor such as a gerotor gear set (although any type of meter can be used). The flow meter 330 includes a shaft 406 coupled to the follow-up sleeve 404 to cause the follow-up sleeve to follow rotation of the valve spool 402. Further details of the steering control unit 224 are specified by U.S. Pat. No. 4,620,416, which is hereby incorporated by reference in its entirety.

Figure 10:
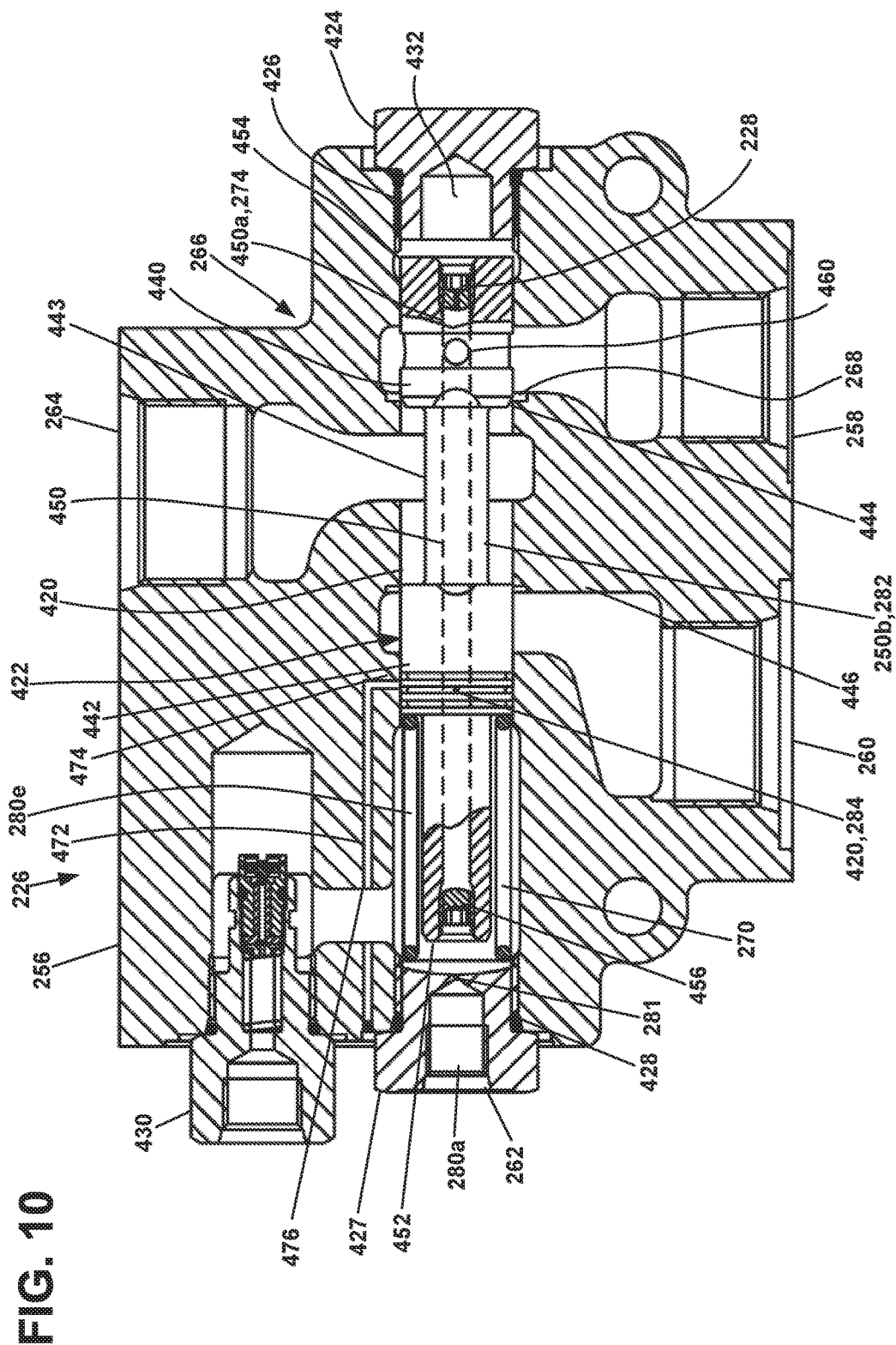
FIG. 10 is a cross-sectional view depicting an example load-sensing priority valve in accordance with the principles of the present disclosure, the load-sensing priority valve is shown operating in a static load-sense mode.
Figure 11:
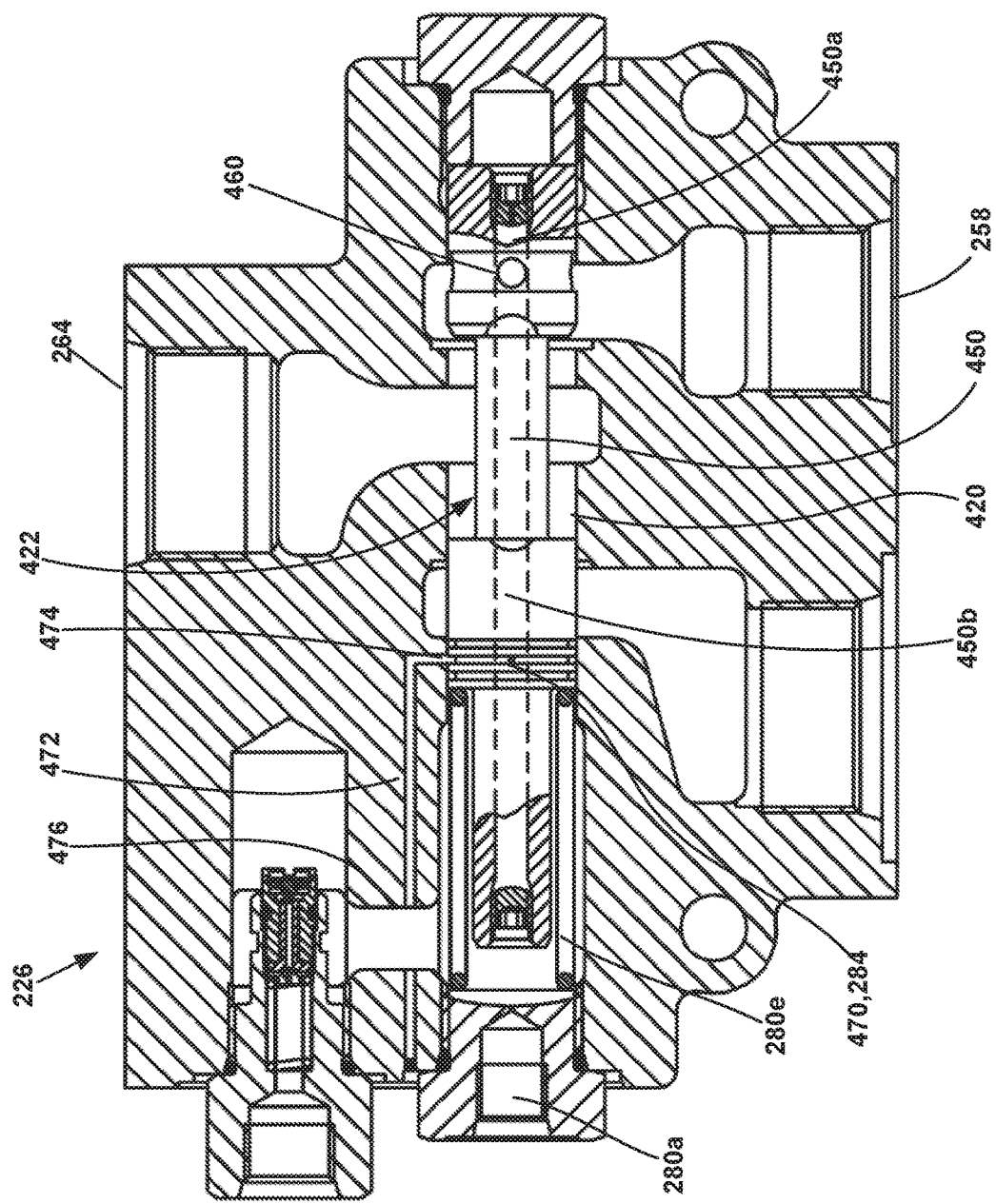
FIG. 11 is another cross-sectional view of the load-sensing priority valve of FIG. 10 showing the load-sensing priority valve operating in a dynamic load-sense mode.

FIGS. 10 and 11 show an example configuration for the load-sense priority valve unit 226. FIG. 10 shows the load-sense priority valve unit 226 operating in the static load-sense mode and FIG. 11 shows the load-sense priority valve unit 226 operating in the dynamic load-sense mode. The load-sense priority valve unit 226 includes the priority valve housing 256 which defines the pump port 264, the load-sense port 262, the auxiliary port 260 and the control flow port 258. The priority valve housing 256 defines a valve bore 420 in which a spool valve member 422 is mounted. The spool valve member 422 can be referred to as a compensation valve member. The spool valve member 422 is mounted to reciprocate longitudinally along the valve bore 420. A plug 424 closes a first end 426 of the valve bore 420 and a plug 427 at a second end 428 of the valve bore 420 cooperates to define the load-sense port 262. The plug 426 defines the load-sense orifice 281 and the load-sense line segment 280a. The load-sense pressure chamber 280e is defined within the valve bore 420 adjacent the second end 428. The control pressure spring 270 is mounted within the valve bore 420 and engages the spool valve member 422 to bias the spool valve member 422 in a rightward direction. Load-sense pressure in the load-sense pressure chamber 280e is applied against the spool valve member 422 to force the spool valve member 422 in a rightward direction. A pressure relief valve 430 is provided for relieving excess pressure that may be present in the load-sense pressure chamber 280e. A pilot pressure chamber 432 is defined adjacent the first end of the valve bore 420. The pilot pressure chamber 432 receives pivot pressure which is applied against the spool valve member 422 to force the spool valve member 422 in a leftward direction in opposition to the control pressure spring 270 and the load-sense pressure.

The spool valve member 422 and the priority valve housing cooperate to define the priority valve 266 of the priority valve unit 226. The spool valve member 422 includes first and second lands 440, 442 separated by a recess 443. The first land 440 includes a metering edge 444 that cooperates with structure defined by the priority valve housing 256 to define the control flow orifice 268. The second land 442 includes a metering edge 446 that controls flow to the auxiliary port 260. Movement of the spool valve member 422 selectively places the recess 443 in fluid communication with either the control flow port 258 (via the control flow orifice 258) or the auxiliary port 260 to modulate low from the pump between the ports 258, 260.

The spool valve member 422 defines a central longitudinal passage 450 that extends though the length of the spool valve member 422 from a first end 452 of the spool valve member 422 to a second end 254 of the spool valve member 422. The first end of the spool valve member 422 is located at the load-sense pressure chamber 280e and is closed by a plug 454. The passage 450 is closed at the first end 452 of the spool valve member 422 by a plug 456. The second end 454 of the spool valve member 422 is located at the pilot pressure chamber 432. The pilot pressure line orifice 228 is located within the passage 450 adjacent the second end 454 of the spool valve member 422.

The spool valve member 422 defines a first side opening 460 (e.g., a cross-port that extends from the passage 450 to an outer diameter of the spool valve member 422). The first side opening 460 is defined though the first land 440 and is in fluid communication with the control flow port 258 so as to provide a path for pressurizing the passage 450 to a pressure corresponding to the pressure of fluid at the downstream side of the control flow orifice 268. A first portion 450a of the passage 450 located between the side opening 460 and the second end 454 of the spool valve member defines the pilot pressure line 274 used to pressurize the pilot pressure chamber 432 with pressure taken from the control flow port 258. Thus, the pilot pressure line 274 is integrated with the load-sense priority valve unit 226.

The dynamic load-sense line 282 and the dynamic load-sense orifice 284 are also integrated with the load-sense priority valve unit. The spool valve member 422 defines a second side opening 470 (e.g., a cross-port that extends from the passage 450 to an outer diameter of the spool valve member 422). The second side opening 470 is defined though the second land 442. The dynamic load-sense line 282 is defined in part by a portion 250b of the passage 250 that extends from the first side opening 460 to the second side opening 470. The dynamic load-sense line 282 is also defined in part by a passage 472 defined by the priority valve housing 256. The passage 472 includes a first end 474 at an outer diameter of the valve bore 420. The first end 474 can include an annular recess that circumferentially surrounds the valve bore 420. The passage 472 also includes a second end 476 in fluid communication with the load-sense pressure chamber 280e. The second side opening 470 and the first end 474 of the passage 472 cooperate to define the dynamic load-sense orifice 284.

When the spool valve member 422 is in the position of FIG. 10, the control flow orifice 268 is relatively small such that the priority valve is adapted to meter only a small amount of flow through the control flow port 258. In this valve position, the second side opening 470 is completely offset from the first end 474 of the passage 472 such that flow blocked between the second side opening 470 and the first end 474 of the passage 472 (i.e., the dynamic load-sense orifice 284 is closed). With the valve in the position of FIG. 10, the load-sense priority valve unit is adapted to operate in a static load-sense mode.

When the spool valve member 422 is in the position of FIG. 11, the control flow orifice 268 is relatively large such that the priority valve is adapted to meter a relatively large amount of flow through the control flow port 258. In this valve position, the second side opening 470 at least partially overlaps the first end 474 of the passage 472 such that flow is permitted between the second side opening 470 and the first end 474 of the passage 472 (i.e., the dynamic load-sense orifice 284 is open). With the valve in the position of FIG. 11, the load-sense priority valve unit is adapted to operate in a dynamic load-sense mode. In this mode, dynamic flow can proceed from the control flow port 258 through the first side opening 460 to the passage 450. Within the passage 450, dynamic flow can proceed through the portion 250b of the passage 250 to the second side opening 470. Flow then proceeds through the dynamic orifice 284 from the second side opening 470 to the first end 474 of the passage 472. Flow next proceeds from the passage 472 to the load-sense pressure chamber 280e. Flow can exit the load-sense pressure chamber 280e through the load-sense line segment 280a and can proceed to the steering control unit via the remainder of the load-sense line 280. The amount of overlap between the second side opening 470 and the first end 474 of the passage 472 determines the size of the dynamic orifice 284 and is dependent upon the longitudinal position of the spool valve member 422 within the valve bore 420.

In the example described above, the dynamic load-sense line and orifice are integrated with the load-sense priority valve unit. In other examples, other integrated configurations can be used. For example, the dynamic orifice and portions of the dynamic load-sense line could be integrated into the valve through the use of an exterior longitudinal slot or slots on the spool valve member 422 that that are adapted to overlap with a passage defined by the valve housing to open the dynamic orifice and to not overlap with the passage to close the dynamic orifice. The exterior longitudinal slot can be in fluid communication with the control flow port 258 and the passage of the housing can be in fluid communication with the load-sense pressure chamber 280e or vice versa. In other examples, portions or entireties of the dynamic load-sense line and orifice can be outside of the priority valve unit 226. In such a case, the dynamic load-sense orifice could be electronically controlled by a controller that monitors the position of the spool valve member 422 and controls the size of the dynamic load-sense orifice accordingly.

Certain broad aspects of the present disclose relate to a load-sense system including a dynamic load-sense orifice having a variable orifice area. The size of the dynamic load-sense orifice can be dependent upon the size of the control flow orifice. The size of the dynamic load-sense orifice can vary directly with the size of the control flow orifice. Changes in size of the dynamic load-sense orifice can be coordinated with changes in size of the control flow orifice. It is preferred for the dynamic load-sense orifice to initially open after the control flow orifice initially opens. However, in certain examples, the dynamic load-sense orifice may open concurrently with the control flow orifice or even slightly before the control flow orifice. It is preferred for the dynamic load-sense orifice to fully open before the control flow orifice fully opens. However, in certain examples, the dynamic load-sense orifice and the control flow orifice can reach fully open states concurrently. It will be appreciated that when the dynamic load-sense orifice is closed it is substantially closed so that meaningful flow does not pass through the dynamic load-sense orifice. In other examples, the dynamic load-sense orifice can have a variable orifice size that never completely closes. A benefit of using a variable load-sense orifice is that the load-sense orifice size can vary with the size of the control flow orifice to vary the dynamic load-sense flow based the flow demand of the control flow orifice. In the prior art, the dynamic load-sense orifice has a fixed orifice size that is designed to be suitable across all flow conditions through the control flow orifice. With a variable dynamic load-sense orifice, the dynamic load-sense orifice size can be varied to provide more customized performance for the different flow demands required to be met by the control flow orifice.

Certain broad aspects of the present disclosure relate to a load sense system that can operate in both a static load sense mode and a dynamic load sense mode. Preferably this is accomplished by providing a dynamic load-sense line having a dynamic load-sense orifice with a variable orifice area for opening and closing the dynamic load-sense line. In other examples, the dynamic load-sense line may include a fixed orifice and a separate valve that functions to open and close the dynamic load-sense line based on a state of the control flow orifice. The separate valve may or may not be adapted to regulate flow.

As used herein, a line is a path or other structure that can receive hydraulic fluid. Lines can be integrated with valve bodies, defined by external conduits such as hoses or tubes, or can include portions defined within valve bodies and portions defined by external conduits. Lines can include ports, channels, conduits, passages and pressure chambers.

What is claimed is:

1. A load-sense system for controlling operation of an actuator, the load-sense system comprising:
   an actuator control valve arrangement defining an actuator control orifice having an orifice area that is variable;
   a compensator valve arrangement for controlling hydraulic fluid flow to the actuator control orifice to maintain a substantially constant pressure drop across the actuator control orifice, the compensator valve arrangement defining a compensator valve orifice for controlling the hydraulic fluid flow provided to the actuator control orifice, the compensator valve arrangement including a compensator valve member that is movable to vary an orifice area of the compensator valve orifice, the compensator valve arrangement also including a control spring that biases the compensator valve member toward a position where the compensator valve orifice is open;
   a pilot pressure line for providing pilot pressure that acts on the compensator valve member in a direction that opposes the control spring, the pilot pressure line being in fluid communication with a control flow line that extends between the compensator valve orifice and the actuator control orifice; and
   a load-sense arrangement for applying a load-sense pressure that acts in the compensator valve member in a direction that assists the control spring, the load-sense arrangement being configured transition between a static mode and a dynamic mode at a mode transition position of the compensator valve member.

2. The load-sense system of claim 1, wherein the load-sense arrangement operates in the static mode for a first range of flow rates through the compensator valve orifice and the load-sense arrangement operates in the dynamic mode for a second range of flow rates through the compensator valve orifice, the second range of flow rates being higher than the first range of flow rates, and the first and second ranges of flow rates not overlapping.

3. The load-sense system of claim 2, wherein the mode transition position of the compensator valve member corresponds to the compensator valve orifice being opened to a mode transition area having a value that is the range of 10-80 percent of a maximum orifice area of the compensator valve orifice.

4. The load-sense system of claim 2, wherein the mode transition position of the compensator valve member corresponds to the compensator valve orifice being opened to a mode transition area having a value that is the range of 15-75 percent of a maximum orifice area of the compensator valve orifice.

5. The load-sense system of claim 2, wherein the mode transition position of the compensator valve member corresponds to the compensator valve orifice being opened to a mode transition area having a value that is the range of 20-70 percent of a maximum orifice area of the compensator valve orifice.

6. The load-sense system of claim 1, wherein the load-sense arrangement includes a load-sense line in fluid communication with a location downstream from the actuator control orifice, wherein a dynamic load-sense orifice integrated at least in part with the compensator valve member opens fluid communication between the control flow line and the load-sense line when the compensator valve member is displaced in a first direction from the mode transition position and closes fluid communication between the control flow line and the load-sense line when the compensator valve member is displaced in a second direction from the mode transition position, the first and second directions being opposite, and the dynamic load-sense orifice having a variable orifice area that is dependent upon a distance the compensator valve member is displaced in the first direction from the mode transition position.

7. The load-sense system of claim 1, wherein the load-sense arrangement includes a load-sense line in fluid communication with a location downstream from the actuator control orifice, wherein a dynamic load-sense orifice opens fluid communication between the control flow line and the load-sense line when the compensator valve member is displaced in a first direction from the mode transition position and closes fluid communication between the control flow line and the load-sense line when the compensator valve member is displaced in a second direction from the mode transition position, the first and second directions being opposite, and the dynamic load-sense orifice having a variable orifice area that is dependent upon a distance the compensator valve member is displaced in the first direction from the mode transition position.

8. The load-sense system of claim 6, wherein the compensator valve member is a valve spool that moves longitudinally within a bore defined by a valve housing, wherein the valve spool defines a central longitudinal passage in fluid communication with the control flow line, wherein the valve spool defines a side spool opening in fluid communication with the longitudinal passage, wherein the valve housing defines a sleeve passage in fluid communication with the load-sense line, and wherein the sleeve passage defines a sleeve passage opening at the bore that cooperates with the side spool opening to define the dynamic load-sense orifice.

9. The load-sense system of claim 1, wherein the actuator control valve arrangement is a steering control unit that controls a steering actuator, wherein the actuator control valve arrangement includes a rotary spool valve member, wherein the actuator control valve arrangement operates as a directional valve and includes two of the actuator control orifices, wherein the actuator control valve arrangement includes a valve sleeve in which the rotary spool valve member is positioned, wherein a limited range of rotary movement is allowed between the rotary spool valve member and the valve sleeve in a first direction from a neutral position to cause one of the actuator control orifices to open, wherein a limited range of rotary movement is allowed between the rotary spool valve member and the sleeve in a second direction from the neutral position to cause the other of the actuator control orifices to open, and wherein the actuator control valve arrangement includes a flow meter mechanically coupled to the valve sleeve for causing the valve sleeve to follow rotation of the rotary spool valve member.

10. The load-sense system of claim 1, wherein the compensator valve arrangement is a load-sense priority valve that modulates flow between the actuator control valve arrangement and an auxiliary circuit with priority given to the actuator control valve arrangement.

11. A load-sense priority valve unit comprising:
a priority valve housing defining a pump port, an auxiliary port, a control flow port;
a valve member for modulating flow from the pump port between the control flow port and the auxiliary port, the valve member being movable to open and close fluid communication between the pump port and the auxiliary and control flow ports, and the valve member being movable to vary an orifice area of a control flow orifice corresponding to the control flow port;
a control spring that biases the valve member toward a position where the control flow orifice is open;
a pilot line for applying a pilot pressure to the valve member in a direction that opposes the control spring;
a load sense line for applying a load-sense pressure to the valve member in a direction that assists the control spring; and
a dynamic load-sense line for boosting the load-sense pressure applied to the valve member, the dynamic load-sense line including a dynamic load-sense orifice having a variable orifice area.

12. The load-sense priority valve unit of claim 11, wherein the priority valve housing defines a valve bore, and wherein the valve member includes a spool valve that moves reciprocally within the valve bore.

13. The load-sense priority valve unit of claim 12, wherein the spool valve defines a central passage, wherein the spool valve defines a first side opening that provides fluid communication between the central passage and the control flow port, wherein the spool valve defines a second side opening in fluid communication with the central passage, wherein a first portion of the central passage extends between the first and second side openings, wherein the priority valve housing defines a housing passage in fluid communication with the load sense line, wherein the passage includes a passage end that opens to the valve bore, wherein the housing passage and the first portion of the central portion form at least a part of the dynamic load-sense line, and wherein the second side opening and the passage end cooperate to define the dynamic load-sense orifice.

14. The load-sense priority valve unit of claim 13, wherein a second portion of the central passage defines the pilot line.

15. The load-sense priority valve unit of claim 11, wherein the dynamic load-sense orifice is integrated at least in part with the valve member.

16. The load-sense priority valve unit of claim 11, wherein the dynamic load-sense orifice is defined between the valve member and the housing.

17. The load-sense priority valve unit of claim 16, wherein at least a portion of the dynamic load-sense line extends longitudinally through a passage defined by the valve member.

18. The load-sense priority valve unit of claim 17, wherein the valve member is a spool valve member and the passage is a central longitudinal passage that extends through the spool valve member.

19. A load-sense steering system for controlling a steering actuator, the load-sense steering system comprising:
a manually actuated steering component;
a hydraulic pump;
a steering control unit including a directional valve operatively coupled to the manually actuated component, the directional valve including first and second actuator ports adapted to be coupled in fluid communication with the steering actuator, the directional valve also including a tank port adapted to be coupled to tank, a pressure port, and a load-sense port, the directional valve being operable in a first active state, a second active state and a neutral state, the directional valve being biased toward the neutral state and being moveable from the neutral state to the first active state or the second active state in response to input from the manually actuated steering component, wherein when the directional valve is in the neutral state the first and second actuator ports are not in fluid communication with the pressure port or the tank port, wherein when the directional valve is in the first active state: a) the pressure port is in fluid communication with the first actuator port via a first flow path; b) the tank port is in fluid communication with the second actuator port via a second flow path; c) a first variable orifice controls flow between the pressure port and the first actuator port; and d) the load-sense port is in fluid communication with the first flow path at a location downstream from the first orifice so as to sense a load pressure, and wherein when the directional valve is in the second active state: a) the pressure port is in fluid communication with the second actuator port via a third flow path; b) the tank port is in fluid communication with the first actuator port via a fourth flow path; c) a second variable orifice controls flow between the pressure port and the second actuator port; and d) the load-sense port is in fluid communication with the third flow path at a location downstream from the first orifice so as to sense the load pressure;
a load-sense priority valve unit including a control flow port, a pump port, and an auxiliary port, the control flow port being fluidly coupled to the pressure port of the directional valve by a control flow line, the pump port being fluidly coupled to an outlet of the hydraulic pump by a pump line, the load-sense priority valve unit including a control flow orifice for controlling flow outputted though the control flow port, the load-sense priority valve unit including a spool valve member that is moveable along a valve axis to vary a size of the control flow orifice, the load-sense priority valve unit including a spring that that applies a control pressure to the spool valve member that biases the spool valve member in a first direction along the valve axis toward a valve position in which the control flow orifice is fully open;

a load-sense line that applies a load-sense pressure to the spool valve member in direction that assist the spring, the load sense being in fluid communication with the load-sense port of the steering control unit;

a pilot line that applies a pilot pressure to the spool valve member in a direction that opposes the spring, the pilot line being in fluid communication with the control-flow port; and a dynamic load-sense line for boosting the load-sense pressure applied to the spool valve member, the dynamic load sense line including a variable dynamic load-sense orifice for controlling flow through the dynamic load-sense line, the variable dynamic load-sense orifice being integrated at least partially with the spool valve member, the variable dynamic load-sense orifice varying in size based on a position of the spool valve member, the dynamic load-sense line directing hydraulic fluid flow from the control flow line to the load-sense line when the dynamic load-sense orifice is open.

20. The load-sense steering system of claim 19, wherein the variable dynamic load-sense orifice transitions between closed and open positions when the control flow orifice is open 10-80 percent of a maximum orifice area of the control flow orifice.

21. A load-sense system for controlling operation of an actuator, the load-sense system comprising:

an actuator control valve arrangement defining an actuator control orifice having an orifice area that is variable;

a compensator valve arrangement for controlling hydraulic fluid flow to the actuator control orifice to maintain a substantially constant pressure drop across the actuator control orifice, the compensator valve arrangement defining a compensator valve orifice for controlling the hydraulic fluid flow provided to the actuator control orifice, the compensator valve arrangement including a compensator valve member that is movable to vary an orifice area of the compensator valve orifice, the compensator valve arrangement also including a control spring that biases the compensator valve member toward a position where the compensator valve orifice is open;

a pilot pressure line for providing pilot pressure that acts on the compensator valve member in a direction that opposes the control spring, the pilot pressure line being in fluid communication with a control flow line that extends between the compensator valve orifice and the actuator control orifice; and a load-sense arrangement for applying a load-sense pressure that acts in the compensator valve member in a direction that assists the control spring, the load-sense arrangement including a dynamic load-sense line including a dynamic load-sense orifice that varies in orifice size based on a position of the compensator valve member.

22. The load-sense system of claim 21, wherein the load-sense arrangement includes a load-sense line in fluid communication with a location downstream from the actuator control orifice, and wherein the dynamic load-sense orifice controls fluid communication between the control flow line and the load-sense line.

23. The load-sense system of claim 22, wherein the dynamic load-sense orifice is integrated at least in part with the compensator valve member.

* * * * *